(12) United States Patent
Theis et al.

(10) Patent No.: US 9,155,994 B2
(45) Date of Patent: Oct. 13, 2015

(54) SYSTEM AND METHOD FOR PURIFYING SHIP DIESEL EXHAUST GASES

(75) Inventors: Mischa Theis, Köln (DE); Karl Reither, Trolsdorf (DE)

(73) Assignee: Bayer Intellectual Property GMBH, Monheim (DE)

( * ) Notice: Subject to any disclaimer, the term of this patent is extended or adjusted under 35 U.S.C. 154(b) by 494 days.

(21) Appl. No.: 13/517,031

(22) PCT Filed: Dec. 17, 2010

(86) PCT No.: PCT/EP2010/070120
§ 371 (c)(1),
(2), (4) Date: Aug. 22, 2012

(87) PCT Pub. No.: WO2011/085908
PCT Pub. Date: Jul. 21, 2011

(65) Prior Publication Data
US 2012/0312166 A1 Dec. 13, 2012

(30) Foreign Application Priority Data
Dec. 21, 2009 (DE) .......... 10 2009 059 773

(51) Int. Cl.
| | |
|---|---|
| *B01D 53/18* | (2006.01) |
| *B01D 53/50* | (2006.01) |
| *B01D 47/06* | (2006.01) |
| *B01D 47/10* | (2006.01) |
| *B01D 53/24* | (2006.01) |
| *B01D 53/75* | (2006.01) |
| *B01D 53/92* | (2006.01) |
| *F01N 3/037* | (2006.01) |
| *F01N 3/04* | (2006.01) |
| *F01N 13/00* | (2010.01) |

(52) U.S. Cl.
CPC .............. *B01D 53/507* (2013.01); *B01D 47/06* (2013.01); *B01D 47/10* (2013.01); *B01D 53/24* (2013.01); *B01D 53/504* (2013.01); *B01D 53/75* (2013.01); *B01D 53/92* (2013.01); *F01N 3/037* (2013.01); *F01N 3/04* (2013.01); *F01N 13/004* (2013.01); *B01D 2247/04* (2013.01); *B01D 2247/101* (2013.01); *B01D 2257/302* (2013.01); *B01D 2257/404* (2013.01); *B01D 2258/012* (2013.01); *B01D 2259/4566* (2013.01); *F01N 2590/02* (2013.01); *Y02T 10/20* (2013.01)

(58) Field of Classification Search
None
See application file for complete search history.

(56) References Cited

U.S. PATENT DOCUMENTS 3,454,216 A * 7/1969 Hemfort ........................ 494/3
3,482,771 A * 12/1969 Thylefors ...................... 494/65
(Continued)

FOREIGN PATENT DOCUMENTS

DE 4002073 C1 5/1991
DE 4331301 A1 6/1995
(Continued)

OTHER PUBLICATIONS

International Search Report for PCT/EP2010/070120 Mailed Apr. 19, 2011.

*Primary Examiner* — Duane Smith
*Assistant Examiner* — Phillip Shao
(74) *Attorney, Agent, or Firm* — Miles & Stockbridge P.C.

(57) ABSTRACT

The invention relates to a system and a method for purifying ship diesel exhaust gases of fine dust particles, and of certain burnt gases, having a spray tower, a venturi washer, a cyclone and a disc centerifuge.

8 Claims, 2 Drawing Sheets

(56) References Cited

U.S. PATENT DOCUMENTS

| | | | |
|---|---|---|---|
| 4,415,508 A * | 11/1983 | Aida et al. | 261/114.1 |
| 5,314,666 A * | 5/1994 | Palomares et al. | 422/605 |
| 5,759,233 A | 6/1998 | Schwab | |
| 6,656,250 B1 | 12/2003 | Listner et al. | |
| 6,953,495 B2 * | 10/2005 | Schwab | 95/221 |
| 7,018,539 B2 * | 3/2006 | Mairal et al. | 210/651 |
| 8,597,413 B2 * | 12/2013 | Peltonen et al. | 95/216 |

FOREIGN PATENT DOCUMENTS

| | | |
|---|---|---|
| DE | 19832174 C1 | 2/2000 |
| WO | 9944722 A1 | 9/1999 |

* cited by examiner

SYSTEM AND METHOD FOR PURIFYING SHIP DIESEL EXHAUST GASES

CROSS REFERENCE TO RELATED APPLICATIONS

This application is a §371 National Stage Application of PCT/EP2010/070120, filed Dec. 17, 2010, which claims priority to German Application No. 10 2009 059 773.5, filed Dec. 21, 2009.

BACKGROUND OF THE INVENTION

1. Field of the Invention

The invention relates to a plant and a process for purifying marine diesel exhausts of fine dust particles, and also of certain flue gases.

2. Description of Related Art

The operation of ships, in particular of large ships, as are generally conventional in container shipping, customarily proceeds using heavy oil as a fuel of the marine diesel engines. This takes place against the background that the prices and availability of such heavy oil are significantly lower than those of refined types of motive power fuel.

Such heavy oils are generally also called "marine residual oil", since they are predominantly obtained from residues of petroleum processing.

In this case residue means that these components are formed as a no longer volatile part of a petroleum-processing process.

The main components of marine residual oil are predominantly alkanes, alkenes, cycloalkanes and highly condensed aromatic hydrocarbons (asphaltenes) having about 20 to 70 carbon atoms per molecule and a boiling range between 300° C. and about 700° C.

In addition, aliphatic and also heterocyclic nitrogen and sulphur compounds are also present in marine residual oils. Customarily the marine residual oils have a nitrogen content of at least 0.5% by weight and a sulphur content of up to 6% by weight. The sulphur content of the residual oils customary in the operation of ships is in the range from 3.5% by weight to 4.5% by weight. In such residual oils, furthermore, all metallic impurities of the petroleum such as nickel, vanadium, sodium, calcium and others are concentrated. Compared with the marine residual oils, diesel power fuels, as are permitted for combustion in cars or lorries in Germany, have a sulphur content of a maximum of 0.001% by weight (10 ppm).

For some time there has existed an International Convention for the Prevention of Pollution from Ships (MARPOL). Since 19 May 2005 this convention also comprises a guideline which regulates the emission of exhausts by ships.

In particular, limiting values are established herein for emitted nitrogen oxides and sulphur oxides for certain sea areas. Compliance with the limiting values is monitored by a multiplicity of national and international shipping authorities and infringement of the regulations is punished with substantial fines.

Currently the ships' owners are therefore forced to change over to comparatively expensive reduced-sulphur motive power fuels since alternatives to these are not available in the maritime sector.

On the other hand, flue gas purification and, in particular, flue gas desulphurization has in the interim become a known technology in the context of operating chemical process plants. However, such devices and processes are customarily plants and processes of considerable size, the adaptation of which to the use for purifying marine diesel exhausts is not readily possible, since on ships the existing space must continue to be available as freight space and since operation in a complex interconnected process as is customary in chemical process plants is not possible.

A process and a device for wet purification of crude gas streams is described for instance in DE 198 32 174 C1. DE 198 32 174 C1 describes that the wet dedusting of dust-laden exhaust and also separating off $SO_2$ and other gaseous components from exhausts is made possible by means of the device and the process carried out in the device.

DE 198 32 174 C1 also describes a plant comprising what is termed a venturi scrubber having a certain nozzle having feed lines for a crude gas and a scrubbing liquid, and also an outlet line for the dust-laden scrubbing liquid together with the purified gas. The outlet line for the dust-laden scrubbing liquid and the purified gas is at the same time a feed line to a cyclone in which the dust-laden scrubbing liquid is thickened and from which the thickened scrubbing liquid is removed from the plant via a first outlet line. Via a second outlet line of the cyclone, which at the same time is a feed line to a rotary scrubber, the remaining residual stream essentially comprising the purified gas is fed to the rotary scrubber. In the rotary scrubber, according to DE 198 32 174 C1 the remaining fractions of the dust are separated off from the purified gas and the very pure gas stream is then removed from the plant via an outlet line of the rotary scrubber.

DE 198 32 174 C1 does not disclose a plant or a process which permits further purification of the scrubbing liquid by means of disc separation devices. Accordingly, the device and the process according to DE 198 32 174 C1 may not enable fractionation of the various components of the crude gas introduced. In addition, DE 198 32 174 C1 does not disclose that the described plant may be usable for purifying marine diesel exhausts or that the disclosed process could find use here.

DE 43 31 301 C2 describes a device for purifying exhausts which, according to DE 43 31 301 C2, differs from devices of similar type otherwise known from the prior art by a reduced space requirement.

DE 43 31 301 C2 does not disclose further devices connected to the device described there, said further devices being for treating the scrubbing liquid used in the device. Accordingly, the device according to DE 43 31 301 C2 likewise may not enable fractionation of the various components of the introduced crude gas. Furthermore, DE 43 31 301 C2 does not disclose that the disclosed device would be usable for purifying marine diesel exhausts.

Against the background of the prior art, the object is therefore to provide a plant and a process which enable marine diesel exhausts from the combustion of heavy oils to be purified and fractionated in such a manner that the ships can continue to be fuelled by heavy oil, but the operation does not infringe the valid provisions with respect to the exhaust limiting values. The above-described fractionation must be implemented such that the highest possible part of the fractions can be introduced back into the surrounding such seawater even during the operation of the ship.

SUMMARY

It has now surprisingly been found as a first subject matter of the present invention that this object can be achieved by a plant for purifying marine diesel exhausts from the combustion of heavy oils, which is characterized in that it comprises
a) a spray tower comprising feed lines for the combustion gas and water, b) a venturi scrubber connected directly to the spray tower and comprising a further feed line for water,
c) a mist eliminator, in the form of a cyclone, which is connected to the venturi scrubber and comprises outlet lines for purified gas and scrubbing liquid, and also
d) a disc separator connected to the mist eliminator via the outlet line for the scrubbing liquid.

DETAILED DESCRIPTION OF A PREFERRED EMBODIMENT

Figure 1:
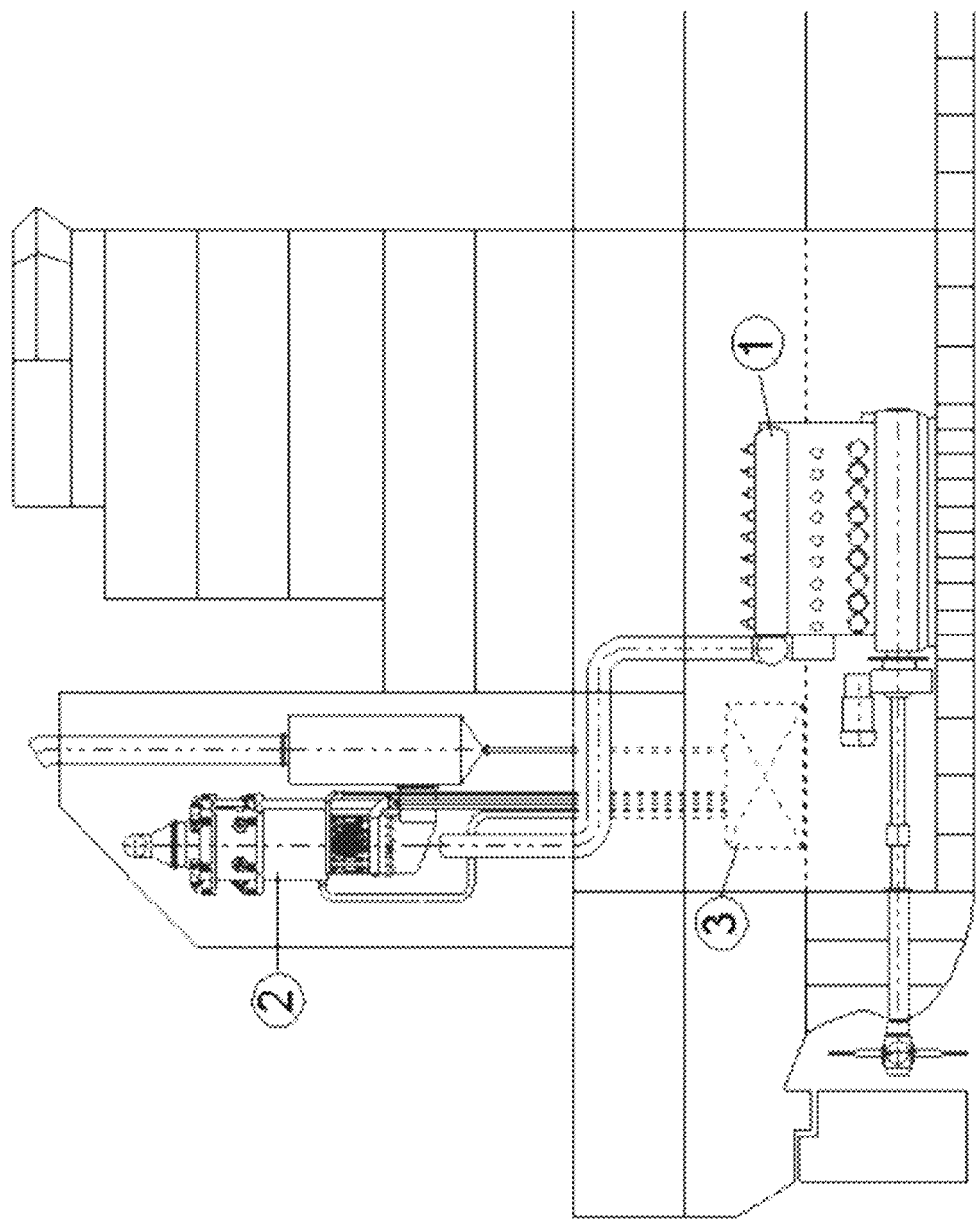
FIGS. 1-2 represent embodiments as described herein.

The plant according to the invention is particularly advantageous because it has surprisingly been found that the above-described combination of devices permits, in operation thereof, only a small fraction of water loaded with fine dust and oil at high concentration to be retained, while the remaining fractions can be safely introduced into the seawater.

In particular, the provision of a disc separator has proved to be surprisingly advantageous, because using this disc separator it is possible, in particular, to separate in a simple manner the multiphase mixture of various solids, an oily fraction and an aqueous fraction, which is seemingly difficult to separate.

The spray tower according to the plant according to the invention is customarily a spray tower which comprises a multiplicity of nozzles for introducing water. The nozzles are then connected via suitable distributor devices in a generally known form to the water feed line to the spray tower.

In a preferred embodiment of the plant, the spray tower comprises at least two levels in the vertical direction, wherein at least one nozzle is situated in each of the levels.

A level in this context denotes an imaginary horizontal section through the spray tower at a site in the vertical extension of the spray tower.

Within the preferred embodiment of the plant having a spray tower which comprises at least two levels, it is preferred if the nozzles in the levels comprise outlet openings which are arranged rotationally symmetrically about the centre point of the spray tower.

Rotationally symmetrically arranged in this context means that, for example, in the case of a single nozzle in one level of the spray tower, this nozzle is arranged in the centre point of the spray tower. In the case of two or more nozzles this means that the outlet openings of the nozzles are arranged at in each case the same angular spacing from one another about the periphery of at least one circle having a radius smaller than or equal to the radius of the spray tower, wherein here a further outlet opening of a nozzle can also be arranged in the centre point of the spray tower and thereby be arranged at a radius of 0.

The outlet openings of the nozzles can be orientated in any direction. Preferably, the outlet openings in at least one of the levels point vertically from top to bottom.

Within the preferred embodiment having a spray tower which comprises at least two levels, the spray tower contains four levels having nozzles. In the vertical direction from top to bottom, in this case the first level comprises only one nozzle having a downwardly directed outlet opening. The second level in this case comprises six nozzles which are arranged about the periphery of the spray tower and the outlet openings of which are orientated downwards. The third level in this case comprises seven nozzles of which six are arranged about the periphery of the spray tower and one is arranged in the centre point of the spray tower, and wherein all outlet openings of these seven nozzles are oriented upwards. The fourth level likewise comprises seven nozzles, of which six are arranged about the periphery of the spray tower and one is arranged in the centre point of the spray tower, wherein, however, all outlet openings of these seven nozzles are orientated downwards.

The venturi scrubber connected directly to the spray tower is situated in a further preferred embodiment of the device according to the invention together with the spray tower in the same device and is separated from the spray tower only by an internal device.

The abovementioned internal device is customarily an internal device which comprises at least a bubble cap as are generally known to those skilled in the art in the field of distillation devices in connection with the bubble cap trays customary there.

Preferably, however, the internal device consists only of a bubble cap.

In a preferred embodiment of the plant according to the invention, only a bubble cap is provided as internal device between spray tower and venturi scrubber, while these are situated in the same device and this one bubble cap is constructed in such a manner that it consists of a plurality of discs with a rim, arranged one above the other, wherein the respective surfaces of the discs with a rim have an angle of incidence to the horizontal in the range from 1° to 15°, and wherein by means of this angle of incidence the surfaces of the discs run essentially conically towards the centre up to a point.

Within this preferred embodiment, the plurality of discs with a rim, arranged one above the other, as a bubble cap are preferably connected to one another via vertically running tube segments and bridges and the discs with a rim each have a diameter which is greater than the diameter of the tube segment situated beneath the disc in question, such that the distance between the tube segment and the disc lying thereabove is bridged by the abovementioned bridges and the disc is thereby connected to the tube segment lying therebeneath.

The tube segment over a respective disc can be mounted on the disc or be a component of the disc situated therebeneath. If the tube segment is a component of the disc lying therebeneath, this disc can also have a circular opening in the form of the tube segment situated thereabove.

Particularly preferably, the abovementioned one bubble cap consists of a first disc having an angle of incidence in the range from 1° to 15° with a rim, on which bridges are mounted which connect this first disc to a first tube segment of a diameter less than the diameter of the first disc, wherein this first tube segment is a component of a second disc of a diameter greater than the diameter of the first disc which in turn has an angle of incidence in the range from 1° to 15°, and wherein this second disc also has a rim on which bridges are mounted which connect this second disc to a second tube segment of a diameter less than the diameter of the second disc, wherein this second tube segment is also a component of a third disc of a diameter greater than the diameter of the second disc. The outer lower rim of the third disc is at the same time connected to the bottom of the spray tower and the bubble cap thereby forms the lid of the directly connected venturi scrubber.

This particularly preferred embodiment is particularly advantageous because owing to the direct connection of the venturi scrubber to the spray tower, firstly the size of the plant can be reduced, but at the same time the advantageous properties of a bubble cap tray relating to the possibility of intensive phase contact can be integrated into the plant.

At the bottom of the spray tower, according to the above-described preferred embodiment, a ring of liquid forms up to a maximum of the height of the second tube segment, wherein the liquid can be removed preferably by outlet lines provided at the spraying tower of the plant. This permits a first liquid substream to be separated off which can optionally be treated separately. Depending on the fractions of contamination already bound in the liquid, this can also be passed back into the seawater in the scope of the process according to the invention.

The venturi scrubber connected to the spray tower is preferably a device as is already described in DE 198 32 174 C1. The use of such venturi scrubbers in the plant according to the invention permits a later operation of the process according to the invention with only a very low pressure drop over the entire plant.

Such a venturi scrubber consists preferably of a flow tube in which one or more parallel venturi throats are situated and one or more hybrid nozzles are disposed upstream of the venturi throats. Particularly preferably, the entry point for liquid into the first resonance chamber of the hybrid nozzle can be varied.

Likewise preferably, the hybrid nozzles of the venturi scrubber are adjustable with respect to their spacing from the venturi throat.

Particularly preferably, the one or more venturi throats are formed by at least two parallel cylinders and are arranged horizontally in a level next to one another and at least one hybrid nozzle in each case is assigned to each throat.

Likewise particularly preferably, displacement bodies are arranged downwards in a vertical direction seen from the venturi throats. These displacement bodies are preferably axially movable.

The hybrid nozzles described hereinbefore in connection with the venturi scrubber are preferably those as are known from DE 43 15 385 A1.

The mist eliminator connected to the spray tower in the form of a cyclone is preferably a device as is likewise already described in DE 198 32 174 C1. Alternatively, however, cyclones as are generally known to those skilled in the art can be used.

The cyclones permit the liquid droplets which exit from the venturi scrubber as an aerosol in the purified gas stream to be separated off.

In a further preferred embodiment of the plant according to the invention, on the cyclone, in addition to the feed lines from the venturi scrubber, further feed lines are also provided which are connected to the outlet lines from the spray tower as are provided in the preferred embodiment of same for removing the liquid from the liquid ring at the bottom of same.

These further feed lines are preferably provided at the top end of the substantially vertical cyclone.

Such a further preferred embodiment of the plant is particularly advantageous, because by means of this, in the cyclone, in addition to the separation of the liquid droplets, a further purification of the gas stream also proceeds once more. Owing to the feed line of the liquid in the top region of the cyclone, gas and liquid flow in countercurrent, so that a particularly efficient purification proceeds. At the same time, the liquid droplets are absorbed directly into the residual liquid and the liquid stream is thereby combined again. This permits a simplified handling of the liquid.

The liquid can be removed via a first outlet line at the bottom of the cyclone. The purified gas stream can leave this cyclone via an outlet line at the top of the cyclone and thereby leave the plant.

The outlet line at the bottom of the cyclone is at the same time the feed line to the disc separator connected in the plant according to the invention.

Disc separators as are usable in the plant according to the invention are those as are generally known to those skilled in the art. Such disc separators comprise in the plant according to the invention at least a first outlet line and a second outlet line. The first outlet line is provided at the bottom of the disc separator and by means of this a highly concentrated solids suspension is removed.

Depending on the type and composition of this highly concentrated solids suspension, this solids suspension can either be fed to a storage device present in a further preferred embodiment of the plant according to the invention, for instance in the form of a tank, or, by means of an outlet line which is connected to the seawater surrounding the ship, can be discharged back into the seawater.

A second outlet line is provided in the upper region of the disc separator. Via this second outlet line a very substantially clean aqueous liquid can be taken off and, optionally together with further clean aqueous liquids, can be released into the seawater.

In one more further preferred embodiment of the plant according to the invention, the plant according to the invention comprises a pump having a filter built into the feed line to the spray tower downstream of the pump, wherein the feed line of the pump (suction side) leads into the seawater.

By means of this preferred embodiment of the plant, it is possible to supply the entire plant according to the invention with seawater for purifying the exhausts.

In one more further preferred embodiment of the plant according to the invention, the plant according to the invention comprises a compressor which feeds ambient air via a feed line to the preferred hybrid nozzles of the venturi scrubber.

By means of the above-described plant according to the invention which, with respect to its individual components, can be produced in any desired size, and therefore is also suitable for use in ships, the process according to the invention hereinafter can be carried out, wherein all necessary starting materials for operating the plant are available at any operating time point of the ship in a sufficient amount and cost-free, in particular in contrast to the generally known processes and plants for flue gas treatment of large industrial plants such as, for instance, power plants which for flue gas desulphurization customarily require the use of alkaline solutions, basic salts and/or oxides.

The present invention therefore also relates to a process for purifying marine diesel exhausts from the combustion of heavy oils, characterized in that it comprises at least the following steps a) feeding a first seawater stream ($M_1$) and marine diesel exhausts (A) into a spray tower, and also absorption of at least some of the pollutant gases and/or solids contained in the marine diesel exhausts (A) into the seawater ($M_1$) fed in, obtaining a first purified gas stream ($G_1$) and a first scrubbing liquid stream ($W_1$),
b) feeding the first purified gas stream ($G_1$) into a venturi scrubber together with a further seawater stream ($M_2$) and also optionally a further gas stream (C), obtaining a second purified gas stream ($G_2$) and a second scrubbing liquid stream ($W_2$) in the form of an aerosol in the second purified gas stream ($G_2$),
c) feeding the second purified gas stream ($G_2$) and second scrubbing liquid stream ($W_2$) in the form of an aerosol into a mist eliminator device in the form of a cyclone, obtaining a second scrubbing liquid stream ($W_2'$) and a finally purified gas stream ($G_3$), d) feeding the second scrubbing liquid stream ($W_2'$) into a disc separator and separating the second scrubbing liquid stream ($W_2'$) into at least one sludge stream (S) comprising the solids of the marine diesel exhausts (A) and a clean wastewater stream ($W_3$) comprising the now absorbed pollutant gases from the marine diesel exhausts (A), and e) discharging the clean wastewater stream ($W_3$) into the seawater surrounding the ship.

In a first preferred embodiment of the process according to the invention, the first scrubbing liquid stream ($W_1$) is fed together with the second purified gas stream ($G_2$) and second scrubbing liquid stream ($W_2$) in the form of an aerosol to the mist eliminator device in the form of a cyclone according to step c) of the process according to the invention.

Within this preferred embodiment it is preferred when such a feeding is performed in such a manner that the second purified gas stream ($G_2$) passes through the mist eliminator device in the form of a cyclone according to step c) of the process according to the invention in countercurrent flow to the first scrubbing liquid stream ($W_1$).

Such a countercurrent flow mode of operation causes a further absorption of pollutant gases possibly still present in the second purified gas stream ($G_2$), and so a particularly good purification of the marine diesel exhausts (A) can proceed without the necessity of further complexity in terms of apparatus.

The process according to the invention is, in particular in combination with the use of the above-described devices as a component of the plant, particularly advantageous, because thereby the pressure drop, based on the stream of the fed in marine diesel exhausts (A), can be kept particularly low.

The process at no point uses devices and/or processing measures which would cause such a particularly high pressure drop. Devices which would be particularly disadvantageous here are, for instance, filters for separating off the solids from the marine diesel exhausts (A) which can be dispensed with by means of the process according to the invention and the devices used therein. Furthermore, synergistically, both the purification of solids is achieved as well as that of pollutant gases absorbable in water, such as, for instance $SO_2$, $NO_X$ etc.

Achieving a particularly low pressure drop in the process according to the invention is, inter alia, also particularly advantageous because the operation of the marine diesel engines only tolerates quite a low pressure drop in the discharge of the marine diesel exhaust (A) from the marine diesel engine. If this becomes too high, backup of the marine diesel exhausts (A) into the combustion chamber of the marine diesel engines occurs, and in the worst case damage to these occurs. However, at least, considerable loss of power of the marine diesel engines occurs.

In the process according to the invention using the above-described plant, in addition, the provision of an additional compressor for generating the necessary differential pressure of the marine diesel exhausts (A) can be dispensed with, which in turn decreases the total energy requirement of the process and thereby does not lead to a significant increase in the operating costs of the ships.

The present invention further relates to the use of a plant comprising a spray tower comprising feed lines for the combustion gas and water, a venturi scrubber connected directly to the spray tower and comprising a further feed line for water, a mist eliminator, in the form of a cyclone, which is connected to the venturi scrubber and comprises outlet lines for purified gas and scrubbing liquid, and also a disc separator connected to the mist eliminator via the outlet line for the scrubbing liquid, for purifying marine diesel exhausts of pollutant gases and solids.

Hereinafter the device according to the invention and the process according to the invention will be illustrated with reference to some examples, but the examples are not to be understood as a limitation of the concept of the invention.

In addition, the invention will be described in more detail with reference to figures, but without them being restricted thereto.

FIG. 1 shows a schematic representation of the plant according to the invention built into a ship. The figure shows, in particular, the marine diesel engine (1), a disc separator shown schematically as a box (3), and also spray tower with attached venture scrubber and mist eliminator in the form of a cyclone (2).

Figure 2:
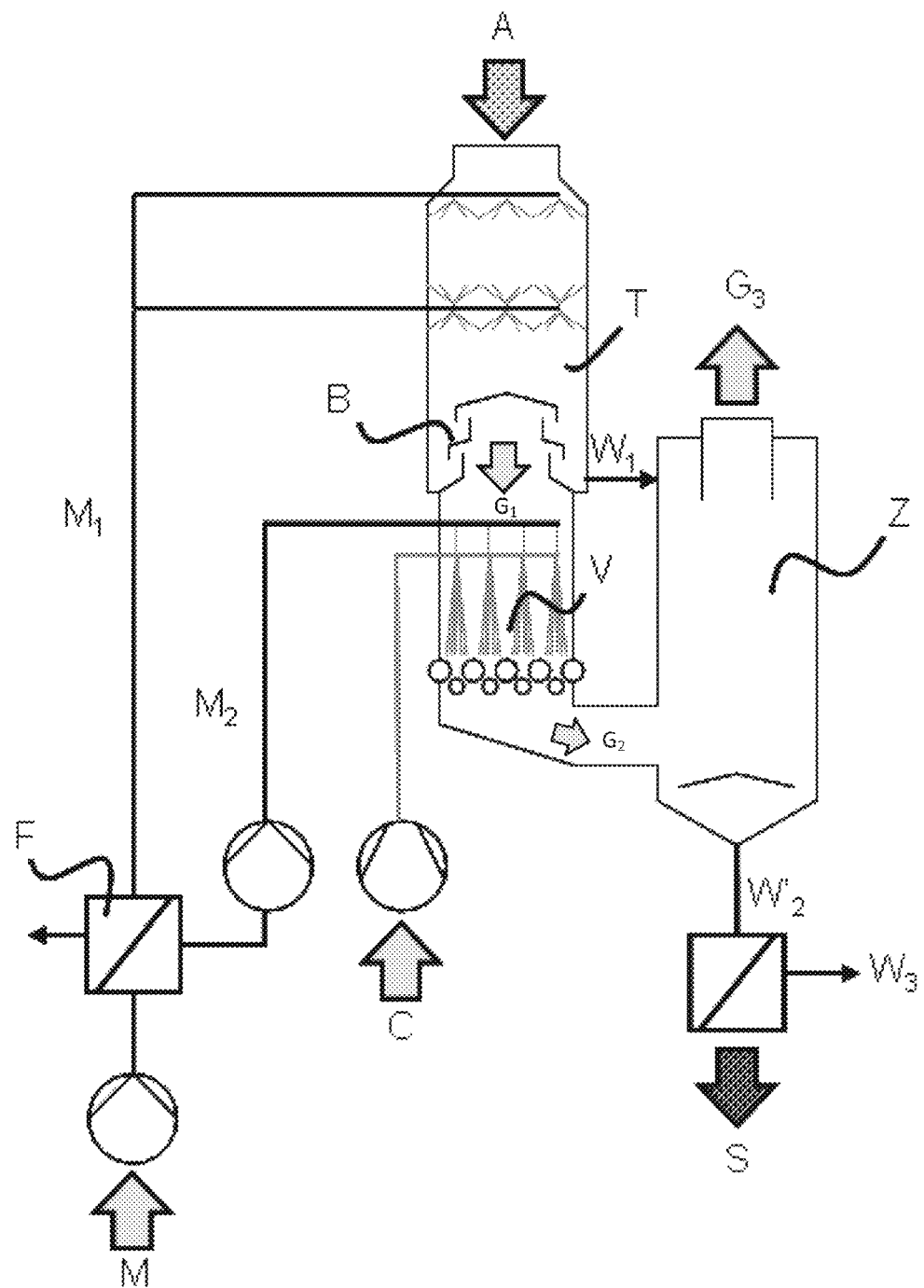

FIG. 2 shows a plant according to the invention for purifying marine diesel exhausts (A) which are fed to a spray tower (T). Seawater ($M_1$) is also fed to the spray tower (T) in two levels via nozzles by means of a pump via a filter (F) which draws in this seawater directly from the water (M) surrounding the ship. A second seawater stream ($M_2$) is fed via a further pump to the venturi scrubber (V), connected directly to the spray tower (T), together with additional ambient air (C), wherein the additional ambient air is drawn in via a compressor. At the bottom of the spray tower (T) there is situated an internal device in the form of a single bubble cap (B) and further outlet lines for removing a first scrubbing liquid stream ($W_1$) which is fed to a cyclone (Z). The cyclone (Z) is in turn directly connected to the venturi scrubber (V). The finally purified gas stream ($G_3$) and also a second scrubbing liquid stream ($W_2'$) are passed out of the cyclone (Z). The second scrubbing liquid stream ($W_2'$) is fed to a disc separator shown schematically below the cyclone and from which in turn a clean wastewater stream ($W_3$) and a sludge stream (S) comprising the solids of the marine diesel exhausts (A) are removed.

EXAMPLES

Example 1

Separation in a Disc Separator of Seawater Loaded with Marine Diesel Exhausts

Two oil-soot seawater mixtures having a solids content of 40 mg/l and 100 mg/l respectively (turbidity: 35 NTU, and 167 NTU respectively, determined as specified in ISO7027 in a Laboratory Turbidimeter 2100AN IS instrument from the Hach Company) were produced by passing a diesel engine exhaust from the combustion of commercially available diesel oil through seawater. The seawater used for the production had a turbidity of 5 NTU (likewise determined as specified in ISO7027 in the Laboratory Turbidimeter 2100AN IS instrument from the Hach Company).

The abovementioned solids concentrations and turbidities correspond to values as would also be obtained if exhaust gases from a conventionally used marine diesel engine were passed through the abovementioned seawater.

According to the Guidelines of The International Convention for the Prevention of Pollution from Ships (MARPOL, MEPC 59/24 Annex 9) only wastewater which has a turbidity of a maximum of 25 NTU above the initial value (here 5 NTU) may be returned to the sea.

For this purpose the two oil-soot seawater mixtures were treated in a disc separator having the technical properties according to Table 1 hereinafter.

TABLE 1

Technical properties of the disc separator according to Example 1

| Property | Value | Unit |
|---|---|---|
| Disc | 19 | [number] |
| Disc diameter (internal) | 48 | [mm] |
| Disc diameter (external) | 93.5 | [mm] |
| Hole circle of the discs | 84 | [mm] |
| Riser channels | 6 | [number] |
| Riser channel diameter | 6 | [mm] |
| Disc spacing | 0.6 | [mm] |
| Disc angle to radius | 50 | [°] |

The volumetric flow rate of the continuously operated disc separator was varied for both oil-soot seawater mixtures in the range of about 5 to 120 l/h (cf. Table 2). The speed of rotation of the disc separator was set the same for all experiments. It was in each case 6885 min$^{-1}$ so that based on the riser channel in each case a relative centrifugal acceleration of 4453×g was obtained.

TABLE 2

Experimental data and experimental results according to Example 1

| | 35 NTU | | 167 NTU | |
|---|---|---|---|---|
| Experiment [#] | Volumetric flow rate [l/h] | Turbidity [NTU] | Volumetric flow rate [l/h] | Turbidity [NTU] |
| 1 | 13.5 | 2 | 4.2 | 21.7 |
| 2 | 27.5 | 5.9 | 13.5 | 27.9 |
| 3 | 55.8 | 7.8 | 22.8 | 36.5 |
| 4 | 76 | 13.5 | 44.7 | 57.4 |
| 5 | 114 | 21.7 | | |

The clear water taken off from the disc separator had in each case the turbidities shown in Table 2 (measurement again as specified in ISO7027 in the Laboratory Turbidimeter 2100AN IS instrument from the Hach Company).

It can be seen that in all cases the limiting values which are set by the International Convention for the Prevention of Pollution from Ships (MARPOL, MEPC 59/24 Annex 9) can be maintained.

It can be seen thereby that the plant according to the invention permits the operation of ships using heavy oils without the limiting values of the wash water introduced back into the seawater being exceeded.

The absorption of pollutant gases into the wash water proceeded, furthermore, essentially quantitatively, and so presentation of the measured values here was omitted.

The invention claimed is:

1. A plant for purifying marine diesel exhaust from combustion of heavy oil, wherein said plant comprises:
    a) a spray tower comprising one or more feed lines for combustion of gas and/or water,
    b) a venturi scrubber connected directly to said spray tower and comprising a further feed line for water,
    c) a mist eliminator, in the form of a cyclone, which is connected to said venturi scrubber and comprises one or more outlet lines for purified gas and scrubbing liquid, and
    d) a disc separator connected to said mist eliminator via said outlet line for said scrubbing liquid, wherein the venturi scrubber is connected directly to the spray tower together with the spray tower in the same device and is separated from the spray tower only by an internal device, wherein this internal device comprises only one bubble cap, and wherein this only one bubble cap includes a first disc having an angle of incidence in the range from 1° to 15° with a rim, on which bridges are mounted which connect this first disc to a first tube segment of a diameter less than the diameter of the first disc, wherein this first tube segment is a component of a second disc of a diameter greater than the diameter of the first disc which in turn has an angle of incidence in the range from 1° to 15°, and wherein this second disc also has a rim on which bridges are mounted which connect this second disc to a second tube segment of a diameter less than the diameter of the second disc, wherein this second tube segment is also a component of a third disc of a diameter greater than the diameter of the second disc, and wherein the outer lower rim of the third disc is at the same time connected to the bottom of the spray tower and the bubble cap thereby forms the lid of the directly connected venturi scrubber.

2. The plant according to claim 1, wherein said spray tower comprises at least two levels in a vertical direction, wherein at least one nozzle is situated in each of the levels.

3. A process for purifying marine diesel exhaust from combustion of heavy oil, wherein said process comprises:
    a) feeding a first seawater stream and marine diesel exhaust into a spray tower, absorbing at least some pollutant gas and/or solid contained in said marine diesel exhaust into said seawater stream fed in, obtaining a first purified gas stream and a first scrubbing liquid stream upstream an internal device comprising only one bubble cap,
    b) feeding said first purified gas stream into a venturi scrubber downstream an internal device comprising only one bubble cap together with a further seawater stream and optionally a further gas stream, obtaining a second purified gas stream and a second scrubbing liquid stream in a form of an aerosol in said second purified gas stream,
    c) feeding said second purified gas stream and second scrubbing liquid stream in a form of an aerosol into a mist eliminator device in a form of a cyclone, obtaining a second scrubbing liquid stream and a further purified gas stream,
    d) feeding said second scrubbing liquid stream into a disc separator and separating said second scrubbing liquid stream into at least one sludge stream comprising said solids of the marine diesel exhaust and a clean wastewater stream comprising absorbed pollutant gas from said marine diesel exhaust, and
    e) discharging the clean wastewater stream into seawater surrounding a ship, wherein this only one bubble cap includes a first disc having an angle of incidence in the range from 1° to 15° with a rim, on which bridges are mounted which connect this first disc to a first tube segment of a diameter less than the diameter of the first disc, wherein this first tube segment is a component of a second disc of a diameter greater than the diameter of the first disc which in turn has an angle of incidence in the range from 1° to 15°, and wherein this second disc also has a rim on which bridges are mounted which connect this second disc to a second tube segment of a diameter less than the diameter of the second disc, wherein this second tube segment is also a component of a third disc of a diameter greater than the diameter of the second disc, and wherein the outer lower rim of the third disc is at the same time connected to the bottom of the spray tower and the bubble cap thereby forms the lid of the directly connected venturi scrubber.

4. The process according to claim 3, wherein said first scrubbing liquid stream is fed together with said second purified gas stream and second scrubbing liquid stream to said mist eliminator device in the form of a cyclone.

5. The process according to claim 4, wherein said feeding is performed in such a manner that said second purified gas stream passes through said mist eliminator device in the form of a cyclone in countercurrent flow to said first scrubbing liquid stream.

6. A plant comprising a spray tower comprising one or more feed lines for combustion of gas and/or water, a venturi scrubber connected directly to the spray tower and comprising a further feed line for water, a mist eliminator, in the form of a cyclone, which is connected to the venturi scrubber and comprises one or more outlet lines for purified gas and/or scrubbing liquid, and a disc separator connected to the mist eliminator via the outlet line for the scrubbing liquid, wherein the venturi scrubber is connected directly to the spray tower together with the spray tower in the same device and is separated from the spray tower only by an internal device, wherein this internal device comprises only one bubble cap and wherein said plant is capable of being used to purify marine diesel exhaust of pollutant gas and/or solid, and wherein this only one bubble cap includes a first disc having an angle of incidence in the range from 1° to 15° with a rim, on which bridges are mounted which connect this first disc to a first tube segment of a diameter less than the diameter of the first disc, wherein this first tube segment is a component of a second disc of a diameter greater than the diameter of the first disc which in turn has an angle of incidence in the range from 1° to 15°, and wherein this second disc also has a rim on which bridges are mounted which connect this second disc to a second tube segment of a diameter less than the diameter of the second disc, wherein this second tube segment is also a component of a third disc of a diameter greater than the diameter of the second disc, and wherein the outer lower rim of the third disc is at the same time connected to the bottom of the spray tower and the bubble cap thereby forms the lid of the directly connected venturi scrubber.

7. The plant according to claim 2, wherein the at least one nozzle selected in each of the levels comprises an outlet opening which is arranged rotationally symmetrically about the center point of the spray tower.

8. The plant according to claim 2, wherein said spray tower comprises four levels having nozzles.

* * * * *